United States Patent
Stearns

(10) Patent No.: US 6,202,698 B1
(45) Date of Patent: *Mar. 20, 2001

(54) MULTIPLE PORT DIAPHRAGM VALVE

(75) Inventor: Frank A. Stearns, Houston, TX (US)

(73) Assignee: Valco Instruments Company, Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,337

(22) Filed: Jun. 18, 1997

(51) Int. Cl.[7] ............................. F16K 11/22; G01N 1/10
(52) U.S. Cl. .................. 137/627.5; 137/595; 137/597; 251/62; 251/331; 73/863.73
(58) Field of Search ................. 251/62, 331; 137/625.42, 137/625.48, 863, 595, 597, 627.5; 73/863.73

(56) References Cited

U.S. PATENT DOCUMENTS

| | | | |
|---|---|---|---|
| 3,085,440 | * 4/1963 | Guenther | 137/625.42 |
| 3,140,615 | * 7/1964 | Broerman | 251/331 X |
| 3,376,894 | * 4/1968 | Broerman | 137/625.48 |
| 3,387,496 | * 6/1968 | Broerman | 251/62 |
| 3,545,491 | * 12/1970 | Broerman | 137/625.48 |
| 3,633,426 | * 1/1972 | Broerman | 251/62 |
| 4,276,907 | * 7/1981 | Broerman | 251/62 X |
| 4,333,500 | * 6/1982 | Broerman | 137/863 |
| 4,531,548 | * 7/1985 | Gottling et al. | 92/84 X |
| 5,601,115 | * 2/1997 | Broerman | 137/595 |

* cited by examiner

Primary Examiner—John Rivell
(74) Attorney, Agent, or Firm—Felsman, Bradley, Vaden, Gunter & Dillon, L.L.P.

(57) ABSTRACT

This disclosure sets forth a diaphragm valve operative with N ports deployed in an upper head. The ports all connect to a diaphragm having a bead defining a flow path around the diaphragm connecting all the ports. In the cylinder below the upper head, there are upper and lower pistons which are forced apart to define a fluid receiving chamber. The fluid receiving chamber is enlarged on the introduction of fluid above a certain pressure thereby raising half of the piston rods bearing against the diaphragm and reduction of fluid pressure in the chamber lowers those push rods and raises an alternate set of push rods to accomplish diaphragm switching by deformation of the resilient material defining the diaphragm.

29 Claims, 2 Drawing Sheets

MULTIPLE PORT DIAPHRAGM VALVE

BACKGROUND OF THE DISCLOSURE

This disclosure sets forth an improved diaphragm valve. It is a valve which controllably switches a set of multiple ports. Indeed, it can operate with any number of ports, and the typical preferred number is 6, 8, 10 or 12 ports. Examples using many ports will be illustrated further. In operation, it is a valve which switches between two positions where operation changes two sets of ports in timed operation.

The valve is constructed with an upper cylinder head, a central cylinder body, and a lower cylinder head. The upper and lower heads are joined to the cylinder body by threaded members which are aligned by threading into a common tapped opening through the cylinder body. This aligns the upper and lower heads with the same or common axis, and it also aligns both heads so that they can be pulled together with independent control of tensioning of the two heads. Pressure responsive pistons are located so that fluid introduced under pressure operates the device. In the preferred version, there are two pistons which are responsive to pressure, the two pistons moving so that the ports are collectively opened and switched dependent on the application of pressure. In that sense, the valve is a binary control device.

The valve uses a diaphragm located at one face of the cylinder and upper head, and is switched so that a flow path adjacent to the diaphragm is controlled. The diaphragm is circular with a bead defining a circular flow path when assembled between the head and cylinder. This bead is clamped shut at selected locations by a number of push rods. In this embodiment, the push rods bear against the diaphragm and upper head from the cylinder. Preferably, the push rods are formed of a compressible resilient material so that precise manufacturing of the push rods is not required, thereby accommodating variations in push rod length. Moreover, the push rods bear against the diaphragm so that the diaphragm is compressed ever so slightly to provide the appropriate flow control. Leakage along the face of the diaphragm is prevented by applying an adequate and sufficient sealing force between the upper head and cylinder. This clamps the diaphragm in place and forms a peripheral seal around the diaphragm. It forms a facial seal in the region of the bead also. The bead formed in the diaphragm is confined so that the push rods bear against the diaphragm from the bottom side, thereby closing the bead and switching the fluid path for the ports in the valve.

In the preferred embodiment, the device is manufactured with N ports where N is a whole number, even integer. The push rods are divided into two sets and are alternated so that there are N push rods and they are spaced approximately between the two ports nearer to each push rod. This enables them to close the diaphragm flow path as will be defined. Moreover, this enables the push rods to bear against the bottom side of the diaphragm in a timed fashion so that first one set and then a second set of push rods is operated. The push rods are alternated so that proper valving action can be obtained. This involves operating alternate push rods with one piston and the remaining set of push rods with the other piston. More will be noted regarding the push rod operation so that the ports are switched under push rod control.

When no pressure is applied to the diaphragm valve, half of the push rods are forced upwardly against the diaphragm. This movement is accomplished by a bias spring. The bias spring is overcome by the application of fluid pressure. This pressure forces a pair of pistons apart, and reverses the state of the push rods so that half the push rods are retracted and the other half are extended. This accomplishes valves switching. As will be understood, push rod travel is relatively short, typically in the range of perhaps 0.002 to about 0.006 inches. Since this range of travel is quite short, the push rods provide sharp movement so that the switching interval is very brief. As one set of rods is retracted, the other is extended against the diaphragm.

One advantage of the present apparatus is the incorporation of a single tension point. A threaded bolt is positioned in each head and the bolts are aligned centrally of the cylinder. This is easier to assemble. It does not pose the problem of applying controlled torque to a set of head bolts around the structure. This assures uniform pressure applied around the periphery of the diaphragm and on the face of the diaphragm so that proper sealing is accomplished. Moreover, sealing to close the gap between the head and cylinder is accomplished uniformly when a single centralized bolt is tightened. This mode of assembly is highly desirable and provides the requisite tension for the clamping action on assembly. The device is also adjustable with regard to operating pressure. By utilization of different springs, the operation pressure can be changed. The system typically operates with a control pressure which is quite low such as 5 or 10 psi and a second pressure which is relatively high such as 1000 psi. Again, the gap between the two pressures can be modified, and the maximum pressure can be changed so that switching occurs at some different pressure.

Summarizing the present disclosure, it is a diaphragm valve which is assembled with a housing having a central cylindrical body with upper and lower heads attached to it. The body is axially drilled with a threaded passage, and each head is attached by means of a single bolt. The bolts are cut to a length so that they do not jam in the threaded passage. There is sufficient space left between the two bolts to enable threading together with controlled tension in each bolt. The diaphragm is clamped between the upper head and cylinder. In the preferred version, the diaphragm is formed of resilient material and has a shaped bead in it which encircles the ports in the upper head. The bead defines a flow path which connects all the ports on a common header until the spaces between ports are closed by raising a set of push rods. Since the device includes N ports, it also uses N push rods where the push rods are divided into two sets, the two sets of push rods being alternately deployed and alternately operated by a pair of pistons enclosed within the cylinder.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
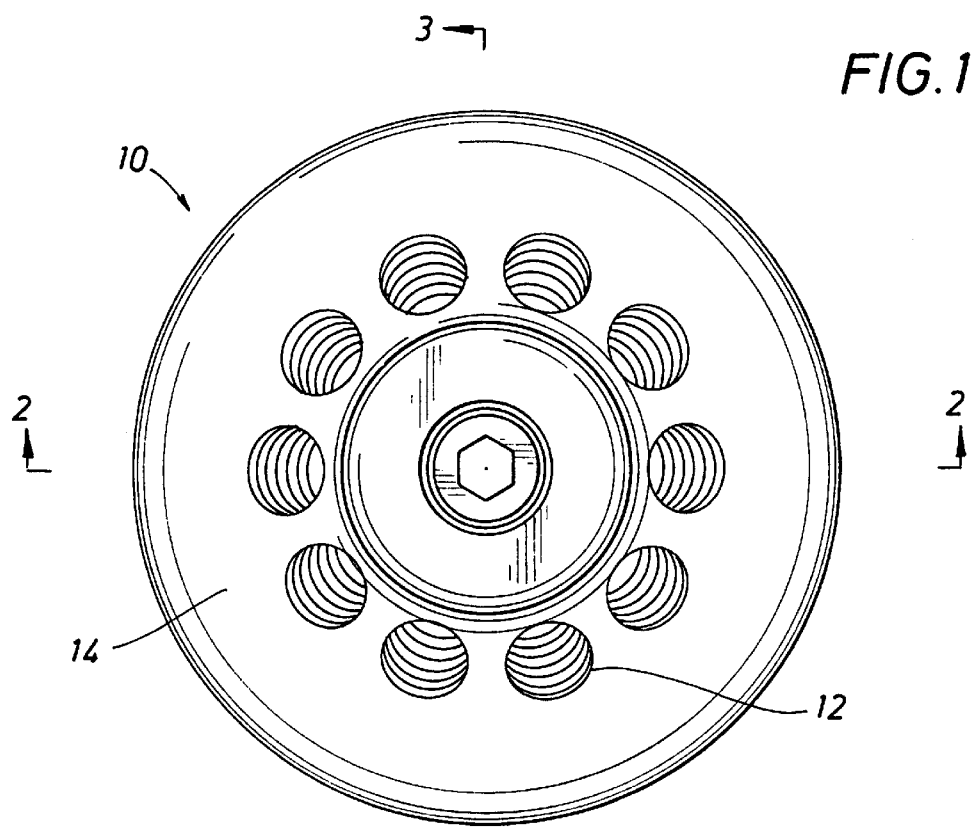
FIG. 1 is a plan view of the diaphragm valve of the present disclosure showing a set of ports in the upper head.
Figure 2:
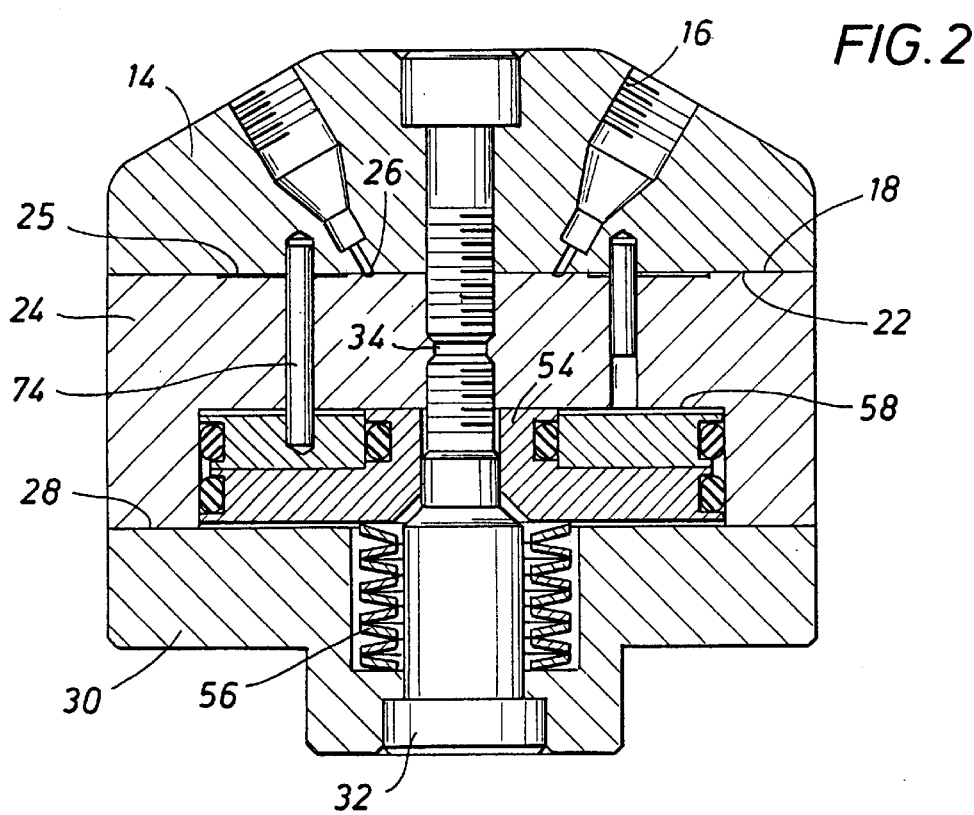
FIG. 2 is a sectional view taken along the line 2—2 of FIG. 1 showing internal details of construction and further illustrating a single bolt for assembling the upper head and also a single bolt for the lower head to the cylindrical body.

Attention is now directed to FIG. 1 of the drawing, where the numeral 10 identifies the diaphragm valve 10 of the present disclosure. It is constructed with a set of N spaced ports 12 which are deployed in a circle and which are evenly spaced. The ports 12 are formed in the upper head 14. This head is shown also in FIGS. 2 and 3 as being at the upper end of the structure. The various ports 12 are provided with internally threaded openings 16 to enable easy connection with a set of fluid flow lines. The ports 12 communicate to the bottom face of the head 14 and are constructed with an internal profile as shown in FIG. 2 which enables the device to make threaded connection with suitable fittings. The device is best used in switching small quantities as for example in a control system or alternately in the equipment associated with a HPLC column. Moreover, the ports 16 are threaded so they connect with industry standard Sittings which are mounted on the ends of tubing, the preferred tubing sizes being typically about ¼ or ⅛ inch tubing.

Going back to FIG. 1, the head 14 is axially constructed with a central opening which is countersunk to receive the head of a head bolt 20. The bolt 20 is formed with an opening conforming with all Allen wrench for tightening or fastening. Assembly and disassembly is achieved through the use of a single size Allen wrench as will be clear on describing the lower head and its fastener also.

In FIG. 2 of the drawings, the head 14 is constructed with at lower planar face 18 which abuts against the top and conforming planar face 22 of the cylindrical body 24. The body 24 has all external profile which is a cylinder. It is provided with a planar upper face to thereby enable the two members to abut snugly and thereby capture a sheet diaphragm member 25. The diaphragm 25 is relatively thin, typically having a thickness in the range of about 2 to 4 mils, and is constructed with a bead in it. The bead is a circular bulge which has a depth of a few mils, al typical depth being about 0.008" or smaller. The bead has the shape of a centralized, circular flow path which communicates with every port 12. Each port 12 terminates in a pilot passage 26 which is directed to the bead. The N ports are provided with a pilot passage 26 and all of them are connected in common to the bead so that they communicate together absent the control mechanism which will be described. The bead is a permanent deformation which is formed in the diaphragm 25. There is a conforming bead in the upper face 22 to receive the diaphragm head on the face of the valve body. The body 24 is thus constructed with a similar bead forming a circle on the exposed upper face. The depth of the bead in the upper face 22 defines the cross-sectional area of the bead so that a flow path of specified cross-sectional area is obtained.

The body 24 has a lower face 28 which abuts against the lower head 30. The head 30 is constructed with a large central passage in it and a suitable shoulder is formed so that it can receive the head of a fastener 32 which again is provided with a central opening suitable for the same size Allen wrench. Through the use of one Allen wrench the bolts 20 and 32 can be tightened or loosened. Both bolts 20 and 32 are provided with threads of a common pitch and construction so that they both thread to the threaded passage 34 in the cylinder body 24. This passage is centralized and is tapped with threads to receive the two bolts. The two bolts are shortened so that the two bolts can thread into the common passage, one from the top and the other from the bottom. As illustrated, a few threads remain between the ends of the two bolts. This is done to assure that the bolts do not bottom out against the other. They are shortened so that the two bolts thread without bumping and without limiting the necessary range of travel of the two bolts. The bolts are tightened to a desired torque, thereby providing a clamping action of the upper and lower heads on the cylinder 24. This avoids the problems of tightening excessively on one side of the cylinder. For instance, if three or four head bolts are spaced on a flange around the respective heads, care must be taken to equalize the tightening torque. Care must be taken to assure that the clamping action achieved by the several bolts is evenly applied around the periphery of the diaphragm. Alignment problems are avoided through the use of the centralized single fasteners for the respective upper and lower heads.

The body 24 contains a fluid pressure responsive system. Access to it is achieved through a port 40. Again, this enables connection with industry standard fittings to deliver fluid under pressure. The port 40 in turn connects with a passage 42. This opens into an area 44 which will be described as the chamber. The chamber is between upper and lower seal rings. The seals 46 are identical and differ only in location. They function as seal rings to define or limit the chamber 44. The chamber itself is defined by a lower movable piston 48 and a movable upper piston 50. The pistons 48 and 50 are forced apart upon introduction of an adequate pressure level into the chamber 44. The chamber 44 is defined on the exterior of a seal ring 52 which is cooperatively clamped between the two pistons. As illustrated, the piston 50 has a larger central opening. It fits on the outside of the seal 52. The piston 48 supports an upstanding smaller skirt 54 which extends centrally on the interior of the piston 50. It serves to align both pistons for concentric cooperation and also is a centralizer which surrounds the lower fastener 32. In this region, the fastener 32 serves in the fashion of a guide post. It assures movement vertically in response to pressure introduced into the chamber 44.

The pistons 48 and 50 are movably mounted with respect to the fastener 32. The lower head 30 is constructed with an enlarged passage so that a stack of Bellville washers 56 can be positioned in that area. The washers force the lower piston 48 upwardly. The lower piston moves fully upwardly to the limits of travel, jamming against the shoulder 58 which serves as a receptacle for the pair of pistons. This makes assembly much easier. Indeed, the pistons are located in the cylinder 24 and the bolt 32 is then passed through the two pistons for assembly. On tighteninng, the Bellville washers 56 provide the requisite force which is maintained even though no pressure is applied to the chamber 44 between the two pistons.

Figure 3:
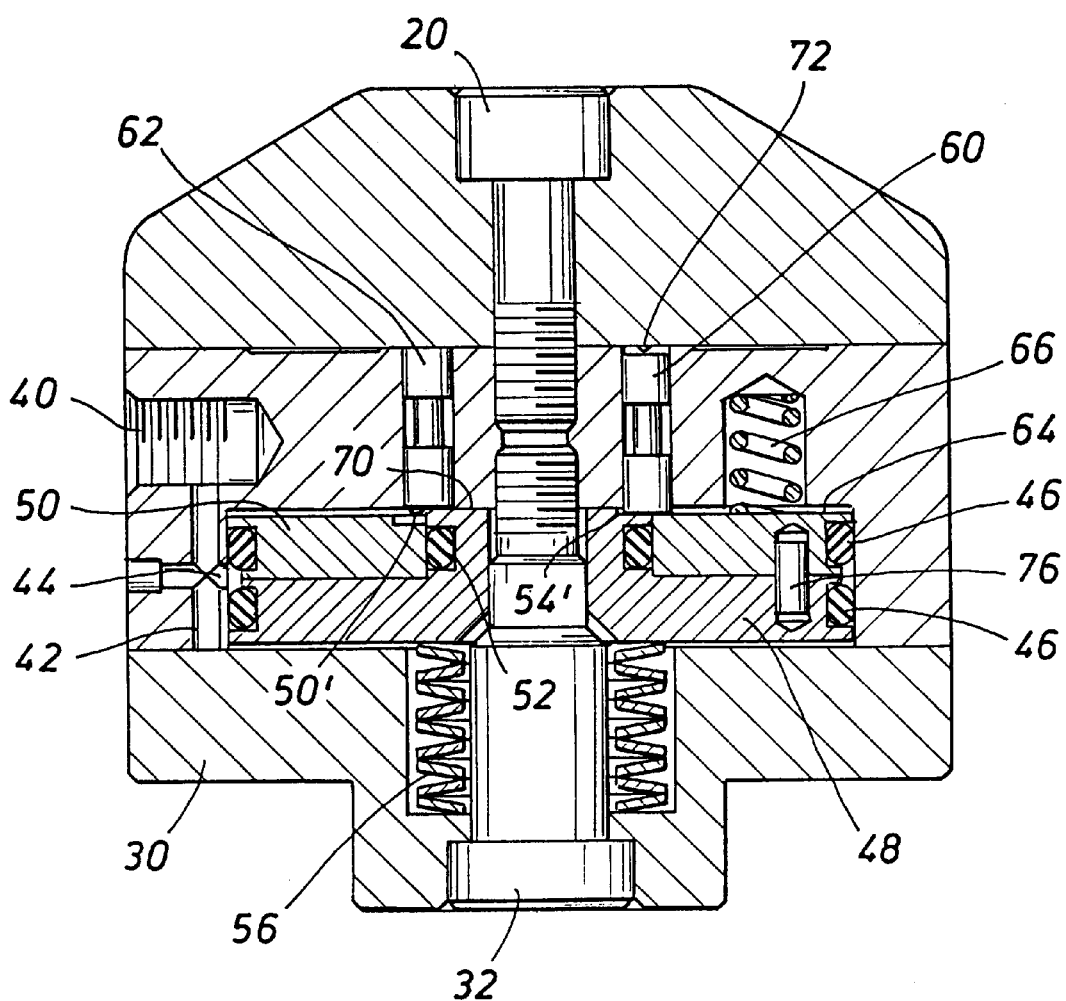
FIG. 3 is a sectional view along the line 3—3 of FIG. 1 and at right angles with the sectional view of FIG. 2 which shows a set of push rods operated by a pair of moveable pistons within said cylinder and wherein the push rods are forced upwardly against the diaphragm to control fluid flow between the ports of the valve.

FIG. 3 shows a first push rod 60 extending completely through the body 24 to the diaphragm. A second push rod 62 is also incorporated. While they are structurally identical, they are operated in different manners. Explaining the push rod 60 first, it will be observed in FIG. 3 that it bears against the top face of the piston 50. The piston 50 is constructed so that it has an internal lip or face bearing against the push rod. The top face 64 extends radially inwardly to be located under the push rod 60. The piston 50 is forced downwardly by a bias spring 66. Upward movement of the piston requires overcoming the bias spring. The bias spring 66 moves the piston 50 downwardly to close the chamber 44 when there is no pressure in the chamber 44. The upper face 64 of the upper piston 50 therefore contacts against the bias spring 66 and also against the push rod 60. By contrast, the push rod 62 bears against a smaller shoulder 70 which is on the central skirt 54 of the lower piston 48. The skirt 54 is cylindrical and concentric about the fasteners 20 and 32. The skirt, however, is notched so that it provides clearance to the push rod 60. Alternating notches 54' and 50' are deployed around the skirt 54 and the upper face of the piston 50, respectively. The high surface or face 70 is shown on the left side of FIG. 3 and contacts against the push rod 62. The push rod 62 is therefore responsive to the position of the lower piston 48. As illustrated in the drawings, the Bellville washers 56 move the two pistons upwardly together but the motion of the two pistons is transferred from that spring to the push rods 62. In other words when the piston 48 moves upwardly to its limits of travel, it still does not contact the push rod 60 to force it upwardly. Clearance is left where the skirt 54 is notched in that area.

Expanding in some detail on the difference between the push rods 60 and 62, the push rod 60 moves upwardly only when fluid under pressure is introduced into the chamber 44 and the pressure is sufficient to overcome bias of the spring 66. In the preferred embodiment, there are typically two or three bias springs. As will be understood, the two sectional views of FIGS. 2 and 3 are taken at right angles so that different components are shown in the different drawings. The springs 66 are replicated at two or three locations. This provides, more or less, an even force applied across the face of the piston 50. On upward motion of the piston, the springs 66 are compressed and the piston 50 thereby applies a compressive force axially of the push rods 60. This operates this push rod 60, it being recalled that alternate push rods are operated by one piston and the remaining and alternating push rods are operated by the other piston. Therefore, the push rod 60 operates out of phase with the push rod 62. The push rods 60 are closed when the piston 50 is raised in response to hydraulic pressure.

In the absence of hydraulic pressure, the chamber 44 is reduced to a minimum capacity. The lower piston 48, however, is forced upwardly by the bias of the Bellville washers 56. They force the piston 48 upwardly. This, in turn, prompts the piston 48 to apply a compressive force to the piston rod 62, thereby closing that piston rod against the diaphragm.

The piston rods 60 and 62 are preferably formed of a resilient and deformable plastic material. They are preferably formed to the same length and diameter. Manufacturing tolerances are accommodated by using a somewhat compressible material. Preferably, a relatively hard plastic material is used. It is not necessary to use a rigid material. Indeed, if the rods 60 and 62 were formed of a ferrous metal, there would be severe tolerance requirements on the manufacturer of the two push rods to assure that they were equal in length. This would otherwise cause irregularities in the application of force against the diaphragm and might damage the diaphragm should one rod be longer, and might permit leakage if one were shorter. Extreme manufacturing tolerances are thereby avoided through this approach. In other words, the push rods 60 and 62 are not rigid and are compressible, thereby tolerating differences in compression and length.

The two sets of push rods are preferably constructed with larger upper and lower faces, and a somewhat more narrow central portion. The narrow central portion defines a region at which compressive forces find some relief by expanding radially outwardly during compression. If need be, substantial amounts of deformation from compression can be tolerated. It is desirable that the upper ends have a relatively large footprint. For that reason, the push rods 60 and 62 are constructed to the maximum diameter accommodated by the drilled passages in the head for the two sets of push rods. This enables the push rods to deform at central portions thereof, thereby accommodating any manufacturing differences, and also applying adequate forces to the diaphragm 25. Recall that the diaphragm is constructed with a circular bead. The bead 72 is shown in FIG. 3 of the drawings and protrudes downwardly toward the push rods 60 and 62. When the rods move downwardly, the bead opens, thereby opening the diaphragm passages between adjacent ports. If, for instance, the plush rod 60 is located between ports 3 and 4, when it moves upwardly, closure is accomplished between those two ports. When it moves downwardly, the space vacated by the push rod permits the bead to open, thereby reopening the fluid pathway. Moreover, the two rods are deployed in alternating fashion as previously mentioned so that different port connections are achieved. With one set of rods up and the other down, connections are made between ports 1 and 2 and also ports 3 and 4. When the other set of rods is raised and the first set is lowered, the connection then goes between ports 2 and 3. Flow between ports 1 and 2 is blocked and flow between ports 3 and 4 is also blocked. This extends all the way around the circle for all the ports 12.

As will be shown in the contrast between the push rods 60 and 62, they operate in alternating timed sequences and are installed so that the range of travel and compression are equal. This enables construction of the push rods 60 and 62 with equal length. They are deployed in passages which are equal. They are operated in alternating fashion by the pistons 48 and 50. If N is 12, then one piston will lift six push rods and the other will lift six. As will be understood, each moves one-half of the push rods.

So that proper control of the valving action is correlated with the increase and decrease in pressure in the chamber 44, it is desirable that the pistons 48 and 50 be assembled at a specified rotational position. While the piston 50 is uniform across its top face, the piston 48 is not because there are notches on it which must be aligned with one-half of the push rods, i.e., the push rods 60 shown at the right side of FIG. 3. To achieve this at the time of assembly, it is desirable that the lower piston 48 at least be aligned at a specific angle. It is not possible to run a single guide pin through both pistons because it would serve as a leakage path. Therefore, a guide pin 74 anchors the upper piston against rotation. In turn, a second guide pin 76 anchors the lower piston 48 against rotation with respect to the upper piston 50. The two guide pins together assure proper alignment of the components at the time of assembly. As will be further understood, the guide pin 74 also aligns the upper head 14. This assures that the ports 12 with their connected pilot passages 26 terminate at proper locations with respect to the push rods. So to speak, the push rods operate best on locating the push rods evenly between the respective ports 12 as viewed in FIG. 1 of the drawings. Each push rod is constructed and arranged so that the width of the push rod is greater than the width of the bead 72 in the diaphragm and yet is smaller than the spacing between adjacent pilot passages 26. This prevents a push rod from closing a pilot passage by blinding the outlet of the pilot passage 26.

In operation, the diaphragm valve of the present disclosure is installed in a system with any number of leads connected to the ports. If not needed, the ports can be simply plugged by placing a plug in the threaded fittings 16. A force is selected for the Bellville spring 56 and that size of spring is installed. Typically, the springs 66 do not need to be varied because all that is required of the bias springs is to move the piston away when there is no pressure applied to the system. After Fluid is applied to the system, torque is applied to the fastener 20 which is tightened until leakage is stopped around the diaphragm. This has a most notable benefit. Only one bolt need be tightened; it is not necessary to try to balance a set of head bolts arranged in a circle on a flange. Rather, the device can be assembled rather loosely and tightening continued until leakage around the diaphragm is stopped. In that sense, the diaphragm serves both as a switching element and also as a seal member. Indeed, the bead 72 may typically have a width of only about 0.004 to about 0.0008. With this installation, the diaphragm is clamped on a skirt area (beyond the bead 72) of substantial width, typically more than enough to seal against leakage. Indeed, pressures can be switched at 5,000 psi with only modest tightening on the fastener 20 utilizing a valve body of about 2 inches in diameter. Once the tension on the bolt 20 is assured to prevent leakage around the edge of the diaphragm, then a seal is adequate when the leakage is stopped.

A pressure is selected for the chamber 44 which overcomes the Bellville washers 56. A force is created by the washers 56 which is exceeded by the force defined by the pressure in the chamber 44 and the cross-sectional area between the largest seal rings 46 and the smaller seal ring 52. When that force is achieved by introducing fluid under pressure to the chamber 44 in excess of that pressure, the lower piston 48 is moved downwardly while the upper piston 50 is moved upwardly. When they separate, the chamber 44 is at its maximum capacity. When that pressure is achieved, switching occurs. Switching occurs because both pistons move simultaneously to open the chamber 44. By contrast, when the pressure is dropped, the chamber 44 is reduced substantially to no volume as the pistons are brought to the closed position. That accomplishes switching in the opposite direction.

An important aspect of the present equipment is the compression of the push rods 60 and 62. Not only do they provide closure, they do not tilt or cant the upper head 14 by applying uneven forces as would occur with steel push rods. Rather, when they operate, they do not cant the head 14 because they are compressible, being formed of a deformable plastic. Preferably, deformation is limited to the elastic range of the material so it is able to be restored to its unloaded shape.

While the foregoing is directed to the preferred embodiment of the present invention, other and further embodiments of the invention may be devised without departing from the basic scope thereof, and the scope thereof is determined by the claims which follow.

What is claimed is:

1. A valve assembly comprising:
   (a) a valve body having a planar face area;
   (b) an upper valve head having a matching planar face area for contact against said valve body at the planar face thereof;
   (c) a seal member compressible therebetween;
   (d) a single tensioned fastener between said valve body and said head pulling said valve body and said upper valve head together to form a leakproof seal therebetween, wherein said single tension fastener comprises co-linear, opposing screws passing through a central opening in said upper valve head and a central open in a lower valve head and threading into a threaded central opening within said valve body;
   (e) at least two movable push rods of equal length operatively cooperating opposing pistons and with said seal member to operate said valve assembly; and
   (f) said opposing pistons are operatively moved by pressure applied through a single fitting port penetrating said valve body and in fluid communication with a chamber defined by said opposing pistons.

2. The apparatus of claim 1 wherein said valve assembly incorporates at least two ports having passages that communicate to said seal member and said ports are selectively sealed thereby.

3. The apparatus of claim 2 wherein said seal member comprises a planar sheet member of flexible material selectively moved against said ports by said push rods.

4. The apparatus of claim 1 wherein said seal member comprises a sheet member having a flow passage formed thereby and said flow passage extends between first and second ports communicating to said seal member.

5. The apparatus of claim 1 wherein said planar face area on said valve body is circular, and said valve head incorporates a matching circular planar face and said circular faces are contacted on opposite sides of said seal member therebetween and said ports are selectively sealed thereby.

6. The apparatus of claim 5 wherein one said push rod is selectively moved against said seal member for sealing flow between first and second ports.

7. The apparatus of claim 1 incorporating N said ports arranged in said valve head and having passages which communicate from said ports to said seal member and further incorporating N movable push rods for sealing said N ports.

8. The apparatus of claim 1 including first and second ports having passages in said valve body wherein said passages extend to one side of said seal member, and further including said push rods operable on the opposite side of said seal member and said one said push rod closes against said seal member to thereby seal communication between said first and second ports.

9. The apparatus of claim 8 including N ports having passages communicating with a common passage within said valve body wherein said ports are deployed for connection through said valve assembly.

10. A valve assembly comprising:
   (a) a valve body;
   (b) an upper valve head contacted at an interface with said valve body;
   (c) N ports connected to a fluid flow passage defined between said body and said head at said interface; and
   (d) a diaphragm between said body and head movable between at least two positions to open a flow path between first and second ports along said passage; wherein
   (e) wherein said valve body encloses
      (i) first and second movable pistons responsive to forces applied thereto by pressure through a single fitting port within said valve body,
      (ii) first and second push rods of equal length and deployed for movement respectively by said first and second pistons so that said first and second push rods move with respect to said diaphragm and close at selected first and second locations said fluid flow passage on movement of said diaphragm in response to said first and second push rods, and (iii) said valve body is controllably clamped between said upper valve head and a lower valve head by means of co-linear, opposing screws passing through central passage ways within said upper and said lower valve heads and threading into a threaded central passage within said valve body.

11. The apparatus of claim 10 further incorporating passages from said N ports to said fluid flow passage wherein selected passages connect at said diaphragm and said diaphragm is movable between a first position to define a flow path along said fluid flow passage, and is selectively movable to a second position to close said passage.

12. The apparatus of claim 10 wherein said diaphragm is a planar member having opposing faces and said N ports communicate with said fluid flow passage on one side of said diaphragm, and said diaphragm is sealed against said fluid flow passage by movement of said diaphragm imparted from the opposite side thereof.

13. The apparatus of claim 12 wherein said diaphragm is moved to a closed position by a movable of one of said push rod bearing against said diaphragm.

14. The apparatus of claim 10 wherein said fluid flow passage has a circular arc, and said N ports are deployed with passages connected to said fluid flow passage along said circular arc, and further comprises a valve closing member comprising said push rods acting against said diaphragm to close selected ports on actuation at said fluid flow passage at selected locations along a circular locus.

15. The apparatus of claim 10 wherein said valve assembly is further defined:
   (a) said valve body is circular to define a circular planar face;
   (b) said valve head is circular to define a circular planar face;
   (c) said valve body and said valve head are contacted at said circular faces to define said interface;
   (d) said N ports are deployed in a circular locus between said body and said head;
   (e) wherein said diaphragm comprises a two sided sheet member and supports said fluid flow passage on one side thereof;
   (f) first and second ports comprising a portion of said N ports having passages opening on said fluid flow passage; and
   (g) said first and second push rods operable to bear against said diaphragm to close said fluid flow passage at selected locations deployed in a circular locus.

16. The apparatus of claim 10 wherein said N ports include:
   (a) first and second ports and said first and second ports incorporate passages extending to said fluid flow passage defining first and second outlets into said fluid flow passage; and
   (b) said first and second push rods supported for movement against said diaphragm to form first and second locations blocking fluid flow along said fluid flow passage on movement of said diaphragm.

17. The apparatus of claim 10 wherein said valve body encloses first and second movable pistons responsive to forces applied thereto; and
   first and second push rods deployed for movement respectively by said first and second pistons so that said first and second push rods move with respect to said diaphragm and close at selected first and second locations said fluid flow passage on movement of said diaphragm in response to said first and second push rods.

18. The apparatus of claim 10 wherein said diaphragm comprises a two-sided sheet of flexible material, and said sheet is deployed at said interface and is adjacent to said fluid flow passage at said interface; and
   a single tensioned fastener joining said valve body to said valve head to clamp said sheet and form a seal therearound.

19. A valve assembly comprising:
   (a) a valve body having a planar face area;
   (b) an upper valve head having a matching planar face area for contact against said valve body at the planar face area therefor;
   (c) a sheet seal member compressibly positioned between said valve body and said upper valve head;
   (d) at least two ports opening through passages on one side of said sheet seal member;
   (e) at least two push rods of equal length and operably positioned for sliding movement against and away from said sheet member wherein said push rods are positioned with respect to said sheet member and said passages to selectively control fluid communication between said passages, and further wherein said push rods accommodate varations in force bearing said sheet member, and further wherein said push rods operably move in opposite directions by means of pressure applied though a single fitting port penetrating said valve body; and
   (f) said sheet member is compressed by the positioning of co-linear opposing screws passing through central passage ways within said upper valve head and a lower valve heads and threading into a threaded central passage within said valve body.

20. The apparatus of claim 19 wherein first and second separate pistons actuate said first and second separate push rods and said first and second push rods operate in cooperation with said fisrt and second pistons moving in opposite directions.

21. The apparatus of claim 20 wherein said first and second push rods comprise identical elongate resilient members capable of compression.

22. The apparatus of claim 21 wherein said push rods comprise elongate cylindrical resilient members having end faces thereon adapted to contact said sheet member.

23. The apparatus of claim 19 wherein said valve body incorporates N passages for receiving N push rods therein and said push rods comprise compressible resilient members.

24. The apparatus of claim 19 wherein N valve openings are adapted to be communicated to the exterior of said valve assembly and each of said valve openings communicates with a passage extending to said sheet member, and said N passages define N fluid flow paths with respect to said sheet member, and said sheet member further comprises a flexible seal sheet adapted to seal against said passages to thereby control flow in said passages, and further wherein N push rods operate against said sheet member to control flow thereat.

25. A valve assembly comprising:
   (a) a valve body having a planar face area and defining an interior cylinder;
   (b) an upper valve head having a matching planar face area for contact against said valve body at the planar face area thereof;
   (c) a sheet seal member compressibly positioned between said planar face areas of said valve body and said valve head;

(d) N port openings wherein each said port opening connects to a dedicated through passage in said valve head and on one side of said sheet seal member, (e) an upper and a lower piston operable within said cylinder, wherein
  (i) a lower face of said upper piston and an upper face of said lower piston define a chamber,
  (ii) said lower piston supports a skirt which extends centrally and internally around said upper face,
  (iii) said skirt defines an upper skirt face which contains N/2 notches therein;

(f) N push rods of equal length and each having an upper and a lower end and each operably positioned for sliding movement, within said valve body, of said upper ends against and away from said sheet member wherein N is an even integer and wherein
  (i) said push rods are positioned with respect to said sheet member and said passages to selectively control fluid communication between said passages,
  (ii) said push rods accommodate variations in force bearing against said sheet member,
  (iii) with said upper piston contacting said lower piston, said lower ends of a first set of N/2 push rods contact said upper skirt face when said upper ends of said first set contact said sheet member, and
  (iv) with said upper piston contacting said lower piston, said lower ends of a second set of N/2 push rods pass through said notches and contact an upper face of said upper piston when said upper ends of said second set are moved away from said sheet member; and (g) lower valve head wherein said valve body is controllably clamped between said upper valve head and a lower valve head by means of co linear, opposing screws passing through central passage ways within said upper and said lower valve heads and threading into a threaded central passage within said valve body.

26. The valve assembly of claim 25 wherein the injection of fluid pressure into said chamber
  (a) moves said upper and said lower pistons in opposite directions;
  (b) upper ends of said first set of N/2 push rods move away from said sheet member and said lower ends of said first set contact notches in said upper piston surface; and
  (c) upper ends of said second set of N/2 push rods contact said sheet member and said lower ends of said second set contact said upper face of said upper piston.

27. The valve assembly of claim 26 wherein said N port openings are spaced equally and concentrically around said valve head.

28. The valve assembly of claim 27 wherein said N push rods are spaced equally and concentrically within said valve body and spaced concentrically with and equally between said N port openings.

29. The valve assembly of claim 28 wherein push rods in said first set on N/2 push rods are positioned alternately with push rods of said second set of N/2 push rods.

* * * * *